United States Patent [19]

Boyes et al.

[11] Patent Number: 5,442,556
[45] Date of Patent: Aug. 15, 1995

[54] AIRCRAFT TERRAIN AND OBSTACLE AVOIDANCE SYSTEMS

[75] Inventors: Jonathan D. Boyes, Westgate-on-Sea; Charles Hewitt, Sittingbourne, both of United Kingdom

[73] Assignee: GEC-Marconi Limited, United Kingdom

[21] Appl. No.: 969,809

[22] PCT Filed: Apr. 27, 1992

[86] PCT No.: PCT/GB92/00771
§ 371 Date: Feb. 18, 1993
§ 102(e) Date: Feb. 18, 1993

[87] PCT Pub. No.: WO92/21077
PCT Pub. Date: Nov. 26, 1992

[30] Foreign Application Priority Data

May 22, 1991 [GB] United Kingdom ............... 9111086

[51] Int. Cl.$^6$ ............................................. G05D 1/04
[52] U.S. Cl. ................ 364/433; 364/424.01; 364/427; 364/428; 364/461
[58] Field of Search ............. 364/433, 460, 454, 449, 364/424.01, 424.06, 427, 428, 461

[56] References Cited

U.S. PATENT DOCUMENTS

| | | | |
|---|---|---|---|
| 4,224,669 | 9/1980 | Brame | 364/433 |
| 4,760,396 | 7/1988 | Barney et al. | 342/65 |
| 4,916,448 | 4/1990 | Thor | 364/433 |
| 4,924,401 | 5/1990 | Bice et al. | 364/433 |
| 5,086,396 | 2/1992 | Waruszewski, Jr. | 364/449 |
| 5,111,400 | 5/1992 | Yoder | 365/424.01 |

OTHER PUBLICATIONS

Denton et al., "Demonstration of an Innovative Technique for Terrain Following/Terrain Avoidance," IEEE National Aerospace and Electronics Conference, May 20, 1985, pp. 522-529.

Primary Examiner—Kevin J. Teska
Assistant Examiner—Stephen J. Walder, Jr.
Attorney, Agent, or Firm—Kirschstein, Ottinger, Israel & Schiffmiller

[57] ABSTRACT

A system for generating, in an aircraft, a warning signal whenever the aircraft is on a potentially hazardous course with respect to the terrain and obstacles thereon imminently to be overflown. The system involves the computation of pull-up trajectories which the aircraft could carry out at a reference point (RP) on the current aircraft flight path (FP) forward of the aircraft current position (CP), taking account of uncertainties of at least aircraft position, which trajectories define collectively a region moving notionally forwardly of the aircraft at a spacing ahead of the aircraft which is a function of aircraft velocity and acceleration and aircraft dynamic response to pilot demands and pilot reaction time, and therefore constitutes a region which the aircraft can imminently overfly. A warning signal is produced if any point on the trajectories has a predetermined relationship with data stored in a map data storage means containing height data relating to the region defined by the trajectories.

4 Claims, 5 Drawing Sheets

AIRCRAFT TERRAIN AND OBSTACLE AVOIDANCE SYSTEMS

BACKGROUND OF THE INVENTION

1. Field of the Invention

This invention relates to aircraft terrain and obstacle avoidance systems.

2. Description of Related Art

Each year there occur aircraft crashes in unacceptable numbers and this number has on average shown no significant sign of diminishing. In the first six months of 1990 there were eighteen such crash incidents involving civil transport passenger carrying aircraft alone (Flight 25th July, 1990). Investigations into the causes of aircraft crash incidents reveal that in many cases the aircraft is operating normally, the cause of the crash incident not being attributable to a system fault. In these types of incidents, graphically often referred to as Controlled Flights into Terrain, the cause is given as pilot error.

And, although the pilot may have contributed to the event, had he been given sufficient warning that, for whatever reason, the aircraft was in imminent danger of crashing, evasive action could have been taken and ground contact avoided.

Large civil passenger carrying aircraft are already fitted with Ground Collision Avoidance Systems (GCAS). These systems are regarded by aircrew members often as unsatisfactory in that they give rise, not infrequently, to nuisance warnings causing the pilot to take spurious evasive action in avoiding a non-existent ground collision risk.

As a result of such experiences warnings generated may tend not infrequently to be ignored by aircrew or the system may even be disabled.

Clearly, such a state of affairs is unacceptable, and a pressing need arises for an aircraft terrain and obstacle avoidance system which is effective reliable and the alarm output of which is believable and acted on by the pilot with a low probability that the warning is a spurious one.

From the foregoing it will be appreciated that desiderata for such a system are: to provide the pilot with a timely warning of impending collision risk, timely in the sense of allowing sufficient opportunity for evasive action to be taken; it must exhibit a low false alarm rate if it is to be credible and instill confidence in the user; it must operate whatever the aircraft altitude or the flight path maybe; in military applications, the system must continue to operate even if the aircraft is in a steep dive or is flying inverted and so that the pilot is able to maintain complete control of the aircraft so that he may take advantage of the full manoeuvrability of the aircraft in executing evasive action in an hostile environment; and, for production purposes, the system should be flexible so as to find application on different types of aircraft possessing different flight characteristics and capabilities. A further desirable characteristic of particular value in military applications is that the system should be adjustable by the pilot to accommodate variable severity in vertical acceleration in a pull-up manoeuvre within stress limits which might be imposed on the airframe.

SUMMARY OF THE INVENTION

According to the invention a method for generating in an aircraft a warning signal output whenever the aircraft is on a potentially hazardous course with respect to the terrain and obstacles thereon imminently to be overflown comprises: (A) computation of an algorithm relating aircraft current position, attitude, velocity and acceleration, at least, and uncertainties assigned to the values of at least aircraft position, the computation defining, repetitively, a multiplicity of hypothetical pull-up trajectory sets, each said set comprising at least: a hypothetical wings-level pull-up trajectory the length and rate of change of gradient whereof are determined by aircraft current velocity and acceleration, an aerodynamically safe hypothetical acceleration value, aircraft pitch attitude, and the zero bank angle attitude of the aircraft; and, where the aircraft has a non-zero bank angle attitude in excess of a predetermined value, at least one additional hypothetical pull-up trajectory notionally extending along the present aircraft flight path, the number of such additional trajectories being determined by the magnitude of the bank angle, and the length and rate of change of gradient of each said additional trajectory being determined by aircraft current velocity and acceleration, the said aerodynamically safe hypothetical acceleration value, aircraft pitch attitude, and the value of the non-zero bank angle, the said multiplicity of hypothetical pull-up trajectory sets notionally collectively defining a region of uncertainty of the terrain and obstacles to be imminently overflown determined by the aforesaid uncertainties, being a region moving notionally with the aircraft forwardly thereof with a spacing between the aircraft and a predesignated point within the said uncertainty region which is a function involving at least aircraft present velocity and acceleration and values for pilot reaction time and aircraft aerodynamic response time to pilot demands; (B) computing, taking into account uncertainty in aircraft height, whether any of the aforesaid trajectory computations define pull-up trajectories the co-ordinate values of any point of which have a predetermined relationship with co-ordinate values stored in map data storage means containing height data relating to the terrain and obstacles as aforesaid in said region; and, (C) in the event that such predetermined relationship is computed, developing said warning signal output.

According to the invention, also, an apparatus for use in performing the method comprises:

an aircraft navigation system providing outputs representing aircraft present velocity, attitude, and geographical position in three dimensions, and uncertainties assigned to the current values of at least the said aircraft position;

map data storage means adapted to store map terrain and obstacle height data; and a computer system having:

a first computer sub-system adapted to receive a horizontal aircraft position output from said navigation system and operable to develop outputs defining a notional grid pattern of size and shape dictated by the magnitude of the aforesaid aircraft position uncertainty output, the said grid pattern being notionally in the form of an areal distribution of grid points;

a second computer sub-system adapted to receive from the navigation system said outputs representative of aircraft present position, velocity and attitude, and operable to develop therefrom outputs representative of the forward displacement of a reference point along aircraft present flight path relative to aircraft present position, the reference point being, notionally, at a pre-designated position within the grid pattern;

a third computer Sub-system adapted to receive outputs from the said first and second computer sub-systems and operable to develop outputs representative of the said multiplicity of hypothetical pull-up trajectory sets, each trajectory commencing at an individual said grid point, and the trajectories in each said set commencing notionally at the same grid point; and a fourth computer sub-system adapted to receive outputs from the third computer sub-system, outputs from the map data storage means and a navigation system output defining height uncertainty, and operable to develop a warning output whenever a predetermined relationship is detected between a map data output and any aircraft hypothetical pull-up trajectory vertical position taking into account uncertainty of aircraft height.

The apparatus may have a pilot input operable to develop an output which is variable at the will of the pilot within prescribed limits, and which, received by the third computer sub-system, is operable to set the said third computer sub-system to store data corresponding to constants to be,employed in the computation of the pull-up trajectories of the said pull-up trajectory sets.

BRIEF DESCRIPTION OF THE DRAWINGS

One apparatus and method in accordance with the invention will now be described, by way of example, with reference to the accompanying drawings in which.

DETAILED DESCRIPTION OF THE PREFERRED EMBODIMENTS

Figure 1:
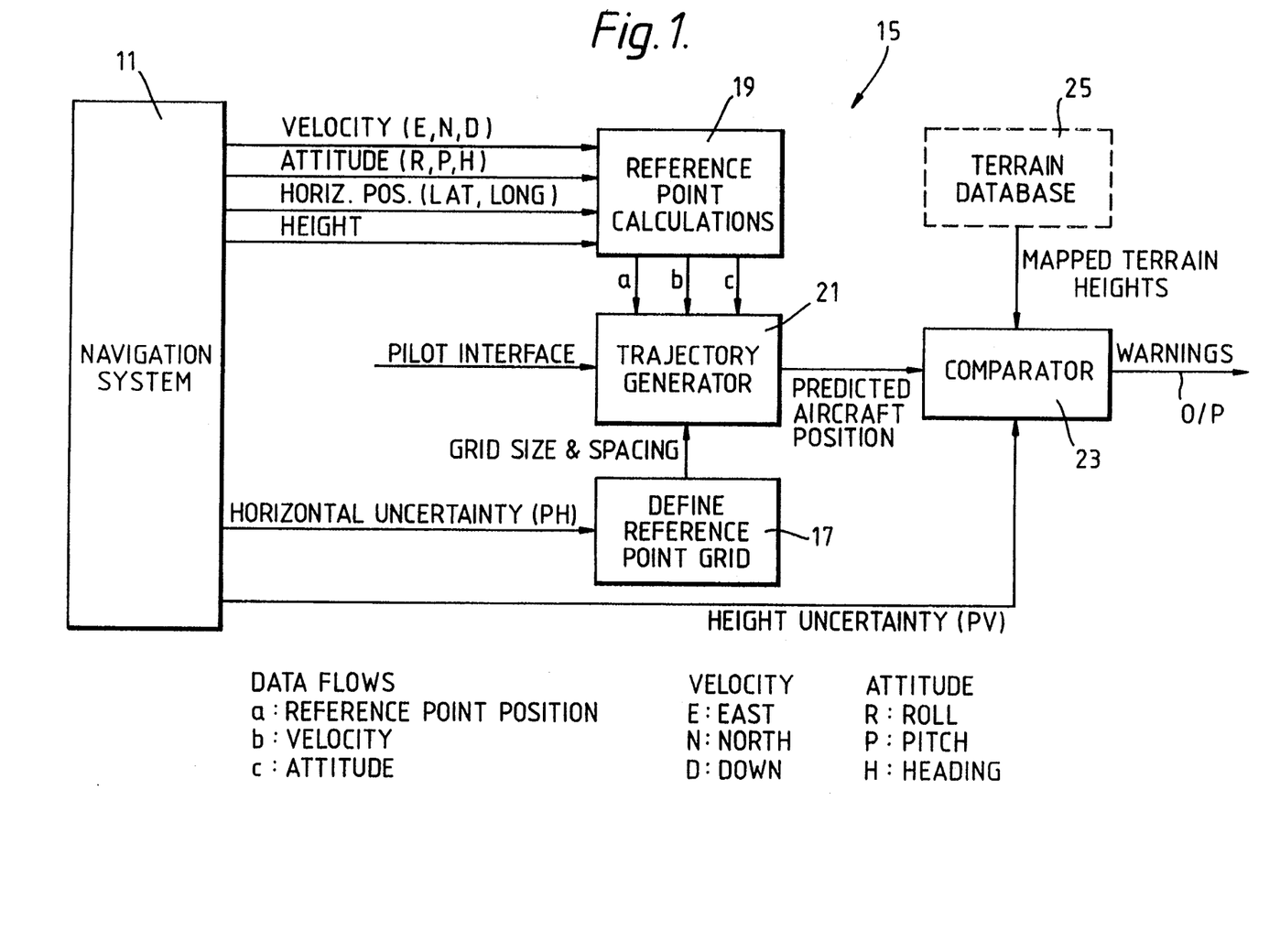
FIG. 1 is a block schematic diagram of the apparatus.

The apparatus, which is carried on-board an aircraft, comprises: an aircraft navigation system 11; a computer system 15 having first, second, third and fourth computer sub-systems 17, 19, 21, respectively; and map data storage means 25.

The navigation system 11 develops outputs representative of aircraft geographical position in three dimensions, lat., long., and alt., respectively, of the aircraft, aircraft velocity V, again in three dimensions East (E), North (N), and Down (D) respectively, and aircraft attitude R, P, H, i.e. roll ($\phi$) pitch ($\theta$) and heading ($\psi$) angles respectively.

It also develops outputs representative of horizontal uncertainty PH, in aircraft geographical position and uncertainty PV in aircraft height. Aircraft altitude, (alt.) may be derived from a barometric sensor, radio altimeter sensor or any other height measuring means, or a combination of any of these.

The first computer sub-system 17 is adapted to receive horizontal uncertainty output PH from the navigation system 11 and is operable to develop outputs defining a notional navigation uncertainty grid pattern (FIG. 2) of size and shape defined by the magnitude of the uncertainty in horizontal position of the aircraft, the said grid pattern being, notionally, in the form of an areal distribution of grid points.

The second computer sub-system 19 is adapted to receive from the navigation system 11, the outputs representative of aircraft present velocity, attitude, and geographical position, computes aircraft acceleration using the velocity input and is operable to develop outputs representative of the forward displacement of a reference point RP (FIG. 3) along the aircraft present flight path FP relative to aircraft present position CP, the reference point RP being, notionally, at a pre-designated position within the grid pattern defined by the outputs of computer sub-system 17.

The third computer sub-system 21 is adapted to receive the outputs a, b and c from the second computer sub-system 19 and the output of the first computing sub-system 17. The sub-system 21 is operable using the aforesaid inputs from sub-systems 17 and 19, to develop at each of a succession of positions along the aircraft flight path an output representing a multiplicity of sets of hypothetical pull-up trajectories, each set of the said multiplicity of sets being associated with a respective one of the several points of the said notional grid pattern (See FIG. 4). The output so developed by the third computer sub-system 21 is applied to the fourth computer sub-system 23. The map data storage means 25 is in communication with the fourth computer sub-system 23.

The fourth computer sub-system 23 additonally receives, from the navigation system 11, the output representative of aircraft height uncertainty PV.

The fourth computing sub-system 23 is operable, in the event that a predetermined relationship is detected between terrain and obstacle digital map data derived from the map data storage means 25 and the co-ordinates of any point along any notional trajectory in any of the said multiplicity of trajectory sets, allowing for uncertainties in trajectory height measurement, to develop a warning signal at an output O/P.

The predetermined relationship detected is that the aircraft height for any point along a trajectory, allowing for uncertainty, is equal to or less than the height for the terrain location corresponding to that point which is stored in the storage means 25. Hence a warning signal is produced if the terrain area, i.e. search area, defined by the multiplicity of trajectory sets (See FIGS. 2 and 5) includes a point which is of greater height than the aircraft would have at the trajectory point corresponding to that search area point.

Figure 3:
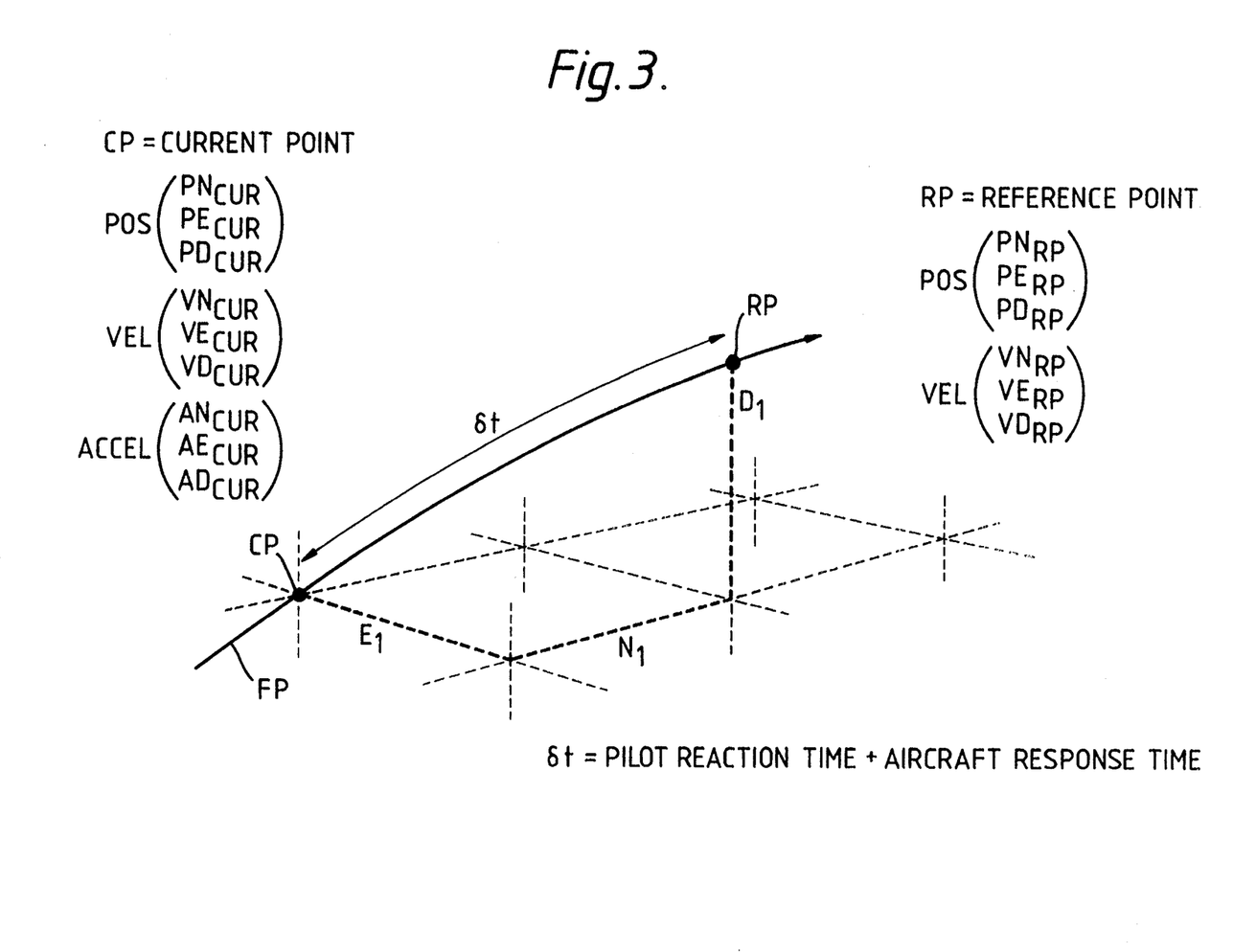
FIG. 3 is a diagram relating to the prediction of the reference point within the grid of FIG. 2.

Since the trajectory sets relate to a reference point RP on the aircraft flight path forward of the current position CP of the aircraft, appropriate evasive action taken by the pilot in response to the warning signal will avoid terrain or obstacle contact by the aircraft.

It will be appreciated that in other embodiments of the invention the predetermined relationship detected may be different e.g. may require the aircraft to exceed terrain height by a predetermined amount.

Figure 2:
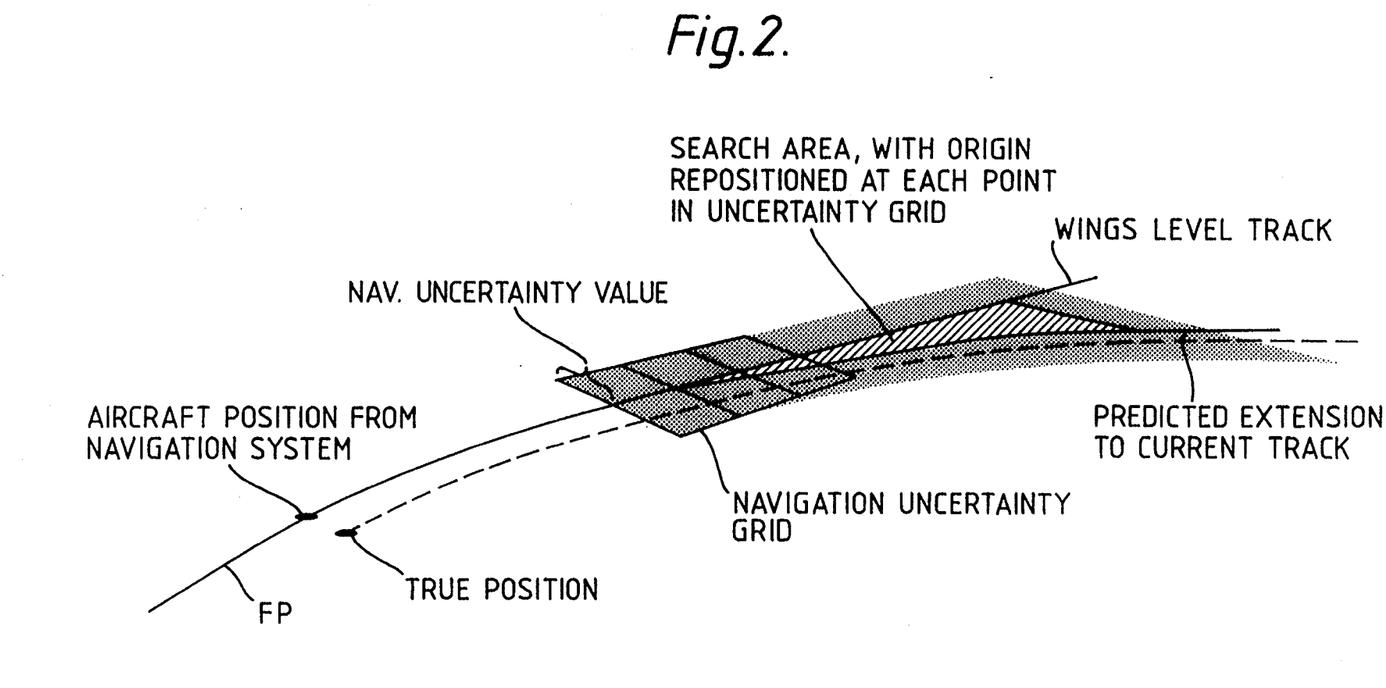
FIG. 2 is a diagram of a hypothetical point grid in relation to aircraft current position.

Referring to FIGS. 2 and 3, using the second computing sub-system 19, the position of the reference point RP the predicted aircraft velocity at the reference point RP and the track angle at the reference point RP are calculated using the measured aircraft position and velocity at the current position CP and extrapolating forward over an assumed pilot and aircraft response time $\delta t$.

1. Determining the aforesaid data involves calculating the acceleration $\overline{A}_{cur}$ at the current point CP $$\bar{A}_{cur} = \frac{\bar{V}_{prev} - \bar{V}_{cur}}{T}$$

where $$\bar{A}_{cur} = \begin{vmatrix} A_{ncur} \\ A_{ecur} \\ A_{dcur} \end{vmatrix}; \bar{V}_{prev} = \begin{vmatrix} V_{nprev} \\ V_{eprev} \\ V_{dprev} \end{vmatrix};$$

$V_{nprev}$ = velocity north at previous iteration etc.

$$\bar{V}_{cur} = \begin{vmatrix} V_{ncur} \\ V_{ecur} \\ V_{dcur} \end{vmatrix}; \text{ and}$$

$T$ = time between iterations

2. Calculating the velocity $V_{rp}$ at the reference point RP $$\bar{V}_{rp} = \bar{V}_{cur} + \bar{A}_{cur} * \delta t$$

where $$\bar{V}_{rp} = \begin{vmatrix} V_{nrp} \\ V_{erp} \\ V_{drp} \end{vmatrix}$$

3. Calculating the position $\bar{P}_{rpoff}$ of the reference point RP relative to the current point CP $$\bar{P}_{rpoff} = \bar{V}_{cur} * \delta t + 0.5 * \bar{A}_{cur} * \delta t^2$$

where $$\bar{P}_{rpoff} = \begin{vmatrix} P_{nrpoff} \\ P_{erpoff} \\ P_{drpoff} \end{vmatrix}$$

4. Calculating the latitude and longitude of the reference point thus:

$$\bar{P}_{rp} = \bar{P}_{cur} + \bar{P}_{rpoff}$$

where $$\bar{P}_{rp} = \begin{vmatrix} P_{nrp} \\ P_{erp} \\ P_{drp} \end{vmatrix}$$

5. Calculating the track angle $\psi_{rp}$ at the reference point RP from the predicted velocities at the reference point $$\psi_{rp} = \tan^{-1}\left(\frac{V_{erp}}{V_{nrp}}\right) \text{ and, finally,}$$

6. Calculating the track angle $\psi_{cur}$ at the current point CP $$\psi_{cur} = \tan^{-1}\left(\frac{V_{ecur}}{V_{ncur}}\right)$$

Figure 4:
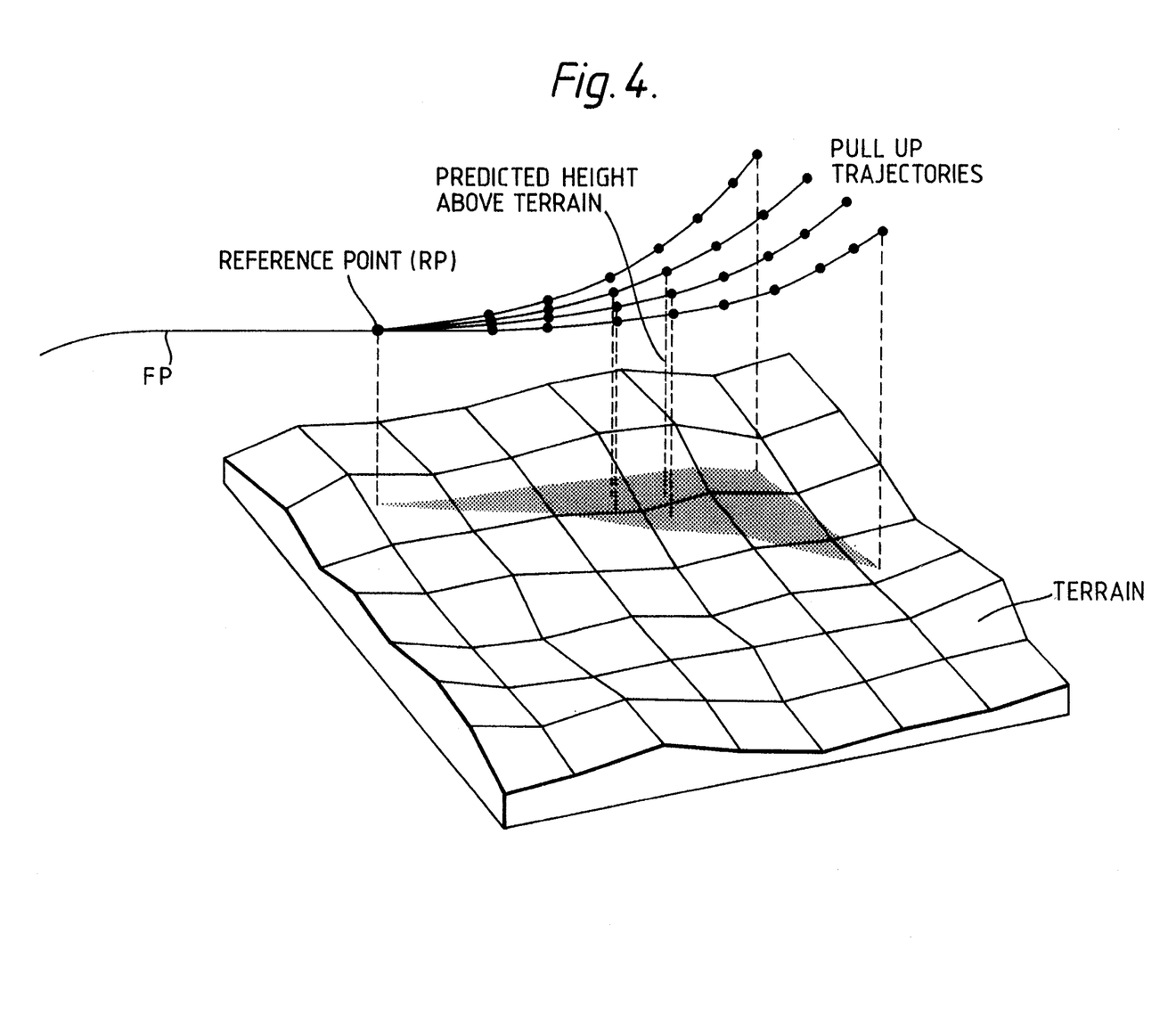
FIG. 4 is a diagram depicting a single set of the hypothetical pull-up trajectories emanating from a point of the grid of FIG. 2.
Figure 5:
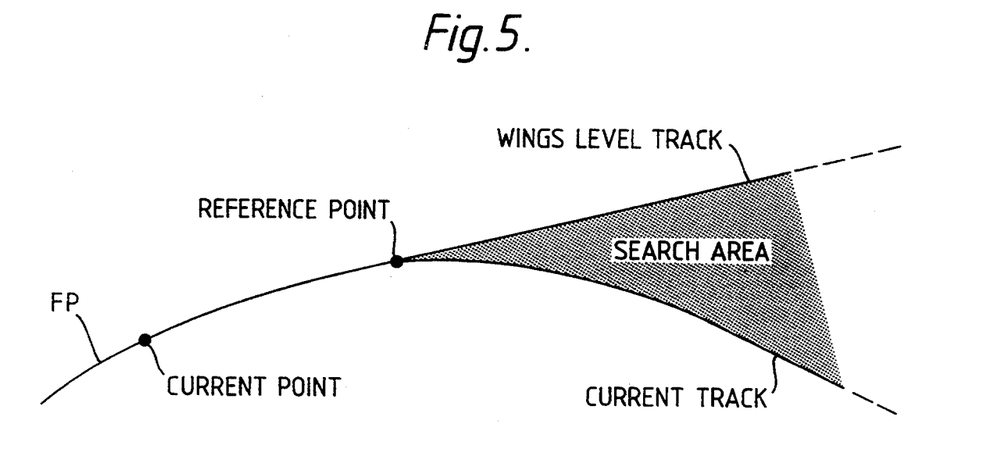
FIG. 5 depicts a search area covered in the trajectories of FIG. 4.

Referring next to FIGS. 4 and 5, calculation, using the third computing sub-system 21, of aircraft bank angle $\phi$ involves 1. Calculating the current centripetal acceleration $G_{cur}$ $$G_{cur} = \left(\frac{\delta\psi V_{hcur}}{\delta t}\right)$$

where $V_{hcur} = \text{SQRT}(V_{ncur}^2 + V_{ecur}^2)$, the horizontal velocity at the current point and $\delta\psi = \psi_{cur} - \psi_{prev}$ and, 2. Calculating the maximum bank angle $\phi$max that allows the aircraft to maintain a ground track consistent with the ground track after taking into account the increased acceleration due to the pull-up manoeuvre.

$$\phi\text{max} = \tan^{-1}\left(\frac{G_{cur}}{SQRT(G_{crit}^2 - G_{cur}^2)}\right)$$

where $G_{crit}$ is the minimum 'g' level required in a pull-up manoeuvre and $G_{crit} > G_{cur}$.

Referring to the same FIGS. 4 and 5 the multiplicity of sets of pull-up trajectories are next calculated. This involves:

1. Converting the velocities $\bar{V}_{rp}$ at RP to aircraft body axes velocity $\bar{V}_{brp}$ $$\bar{V}_{brp} = C_g^b \bar{V}_{rp}$$

where $$\bar{V}_{brp} = \begin{vmatrix} V_{xrp} \\ V_{yrp} \\ V_{zrp} \end{vmatrix}$$

and $C_g^b$ is a direction cosine matrix to convert from geographical axes to body axes $C_g^b$ is defined as:

$$\begin{vmatrix} \cos\theta\cos\psi, & \cos\theta\sin\psi, & -\sin\theta \\ \sin\phi\sin\theta\cos\psi - \cos\phi\sin\psi, & \sin\phi\sin\theta\sin\psi + \cos\phi\cos\psi, & \sin\phi\cos\theta \\ \cos\phi\sin\theta\cos\psi + \sin\phi\sin\psi, & \cos\phi\sin\theta\sin\psi - \sin\phi\cos\psi, & \cos\phi\cos\theta \end{vmatrix}$$

2. Calculating the along track velocity $V_{track}$ $V_{track} = \text{SQRT}(V_{xrp}^2 + V_{yrp}^2 + V_{zrp}^2)$ 3. Calculating the angle of attack $$\alpha = \tan^{-1}\left(\frac{-V_{drp}}{V_{hrp}}\right)$$

4. Calculating the flight path angle $\gamma$ $\gamma = \theta - \alpha$

5. Calculating the attitude as it changes with time t for each point along a pull-up trajectory until the pitch angle $\theta$ exceeds a predetermined value $$\begin{vmatrix} \phi' \\ \theta' \\ \psi' \end{vmatrix} = \begin{vmatrix} \phi \\ \theta \\ \psi \end{vmatrix} + \begin{vmatrix} \tan\theta\sin\phi \\ \cos\phi \\ \sin\phi/\cos\theta \end{vmatrix} * \frac{G_{crit} * g * t}{V_{track}}$$

where g is the earth gravitational constant and t is the flight time along the trajectory from reference point RP. The roll is kept constant to ensure that the predicted ground track is maintained throughout the manoeuvre, hence:

$$\begin{vmatrix} \phi' \\ \theta' \\ \psi' \end{vmatrix} = \begin{vmatrix} \phi \\ \theta \\ \psi \end{vmatrix} + \begin{vmatrix} 0 \\ \cos\phi \\ \sin\phi/\cos\theta \end{vmatrix} * \frac{G_{crit} * g * t}{V_{track}}$$

6. Updating the velocity for points along the pull-up trajectory $$\overline{V}^1_{brp} = \overline{V}_{brp} + \overline{A}_B * t$$

where $\overline{A}_B = \begin{vmatrix} -g\sin\alpha \\ \cos\alpha\sin\phi \\ g\cos\alpha\cos\phi + (G_{crit} - 1) * g \end{vmatrix}$ 7. Calculating the position offset from the reference point $$\overline{P}^1_{boff} = \overline{P}_{boff} + \overline{V}^1_{brp} * t$$

where $$\overline{P}_{boff} \begin{vmatrix} P_{xboff} \\ P_{yboff} \\ P_{zboff} \end{vmatrix} = \begin{vmatrix} 0 \\ 0 \\ 0 \end{vmatrix} \text{ for the first iteration}$$

8. Converting this to the geographic reference frame $$\overline{P}_{goff} = C_b^g \overline{P}^1_{boff}$$

where $$\overline{P}_{goff} = \begin{vmatrix} P_{gnoff} \\ P_{geoff} \\ P_{gdoff} \end{vmatrix} \text{ and } C_b^g \text{ is the inverse of } C_g^b$$

9. Calculating the absolute position of the iteration point $$\overline{P}_{point} = \overline{P}_{rp} + \overline{P}_{goff}$$

where $$\overline{P}_{point} = \begin{vmatrix} P_{npoint} \\ P_{epoint} \\ P_{dpoint} \end{vmatrix}; \text{ and,}$$

10. Updating the flight path angle and velocity and repeat the process from step 5 using $$\gamma' = \theta' - \alpha$$

$$V^1_{track} = SQRT(V^1_{xrp}{}^2 + V^1_{yrp}{}^2 + V^1_{zrp}{}^2)$$

The aforesaid procedure is in respect of a single value for bank angle $\phi$. The procedure is repeated for different values of bank angle at regular angular intervals between a zero (wings-level) bank angle and the bank angle $\phi$max calculated as aforedescribed.

Thus whilst a wing-level pull-up trajectory is always calculated for every grid point, the number of non-zero bank angle trajectories calculated for a grid point depends on aircraft current bank angle.

Having calculated all the trajectories of the multiplicity of sets of pull-up trajectories, i.e. a set for each grid point in the navigation uncertainty grid pattern, the following steps are performed.

1. Deriving for every horizontal position found in the multiplicity of sets of trajectories calculations the height of the corresponding position in the terrain and obstacle digital map stored in storage means 25.

2. Subtracting the height uncertainty received from the navigation system 11 from the predicted height at each point calculated in the multiplicity of sets of aircraft pull-up trajectories, and 3. Comparing the terrain height calculated in (1) and the aircraft height calculation in (2) and generating a warning output if the result of the value derived under (1) above is equal to or greater than the result of the calculation performed under (2) above.

If desired, the third computer sub-system 21 may be provided with a pilot interface input (FIG. 1) to enable the pilot to vary the values of constants, stored in the sub-system 21 and employed in computation of the pull up trajectory sets, e.g. $G_{crit}$.

We claim:

1. A method of generating in an aircraft a warning signal output whenever the aircraft is on a potentially hazardous course with respect to the terrain and obstacles thereon imminently to be overflown, comprises the steps of: using a navigation system for obtaining values of aircraft current position, attitude, velocity and acceleration, and uncertainties assigned to the current values of at least aircraft position; storing co-ordinate values of map terrain and obstacle height data in a map data storage means; using a computer system for determining, repetitively, a multiplicity of hypothetical pull-up trajectory sets, each said set including a hypothetical wings-level pull-up trajectory the length and rate of change of gradient whereof are determined by the aircraft current velocity and acceleration, an aerodynamically safe hypothetical acceleration value, aircraft pitch attitude, and a zero bank angle attitude of the aircraft; determining where the aircraft has a non-zero bank angle attitude in excess of a predetermined value, at least one additional hypothetical pull-up trajectory notionally extending along the present aircraft flight path, the number of said additional trajectories being determined by the magnitude of the bank angle, and the length and rate of change of gradient of each said additional trajectory being determined by the aircraft current velocity and acceleration, the aerodynamically safe hypothetical acceleration value, the aircraft pitch attitude, and the value of the non-zero bank angle; notionally collectively determining from said multiplicity of hypothetical pull-up trajectory sets a region of uncertainty of the terrain and obstacles to be imminently overflown determined by said uncertainties, said region moving notionally with the aircraft forwardly thereof with a spacing between the aircraft and a predesignated point within said uncertainty region which is a function involving at least said aircraft present velocity and acceleration, and values for pilot reaction time and aircraft aerodynamic response time to pilot demands; determining, taking into account uncertainty in aircraft height, whether any of the pull-up trajectories have any point with co-ordinate values having a predetermined relationship with the co-ordinate values stored in the map data storage means in said region; and developing a warning signal output in the event that such predetermined relationship is determined.

2. A method according to claim 1, wherein said predetermined relationship is that the aircraft height for any point along a trajectory, allowing for uncertainty, is equal to or less than the height data in the storage means relating to a point corresponding to that trajectory point.

3. An apparatus for generating in an aircraft a warning signal output whenever the aircraft is on a potentially hazardous course with respect to terrain and obstacles thereon imminently to be overflown, comprising: an aircraft navigation system providing outputs representing aircraft present velocity, attitude, and geographical position in three dimensions, and uncertainties assigned to the current values of at least the said aircraft position; map data storage means adapted to store map terrain and obstacle height data; and a computer system having: a first computer sub-system adapted to receive the horizontal aircraft position output from said navigation system and operable to develop outputs defining a notional grid pattern of size and shape dictated by the magnitude of the aforesaid aircraft position uncertainty output, the said grid pattern being notionally in the form of an areal distribution of grid points; a second computer sub-system adapted to receive from the navigation system said output representative of aircraft present position, velocity and attitude, and operable to develop therefrom outputs representative of the forward displacement of a reference point along aircraft present flight path relative to aircraft present position, the reference point being, notionally, at a pre-designated position within the grid pattern; a third computer sub-system adapted to receive outputs from the said first and second computer sub-systems and operable to develop outputs representative of the said multiplicity of hypothetical pull-up trajectory sets, each trajectory commencing at an individual said grid point, and the trajectories in each set commencing notionally at the same grid point; and a fourth computer sub-system adapted to receive outputs from the third computer sub-system, outputs from the map data storage means and a navigation system output defining height uncertainty, and operable to develop a warning output whenever a predetermined relationship is detected between a map data output and any aircraft hypothetical pull-up trajectory vertical position taking into account uncertainty of aircraft height.

4. An apparatus according to claim 3 having a pilot input operable to develop an output which is variable at the will of the pilot within prescribed limits, and which, received by the third computer sub-system, is operable to set the said third computer sub-system to store data corresponding to constants to be employed in the computation of the pull-up trajectories of the said pull-up trajectory sets.

* * * * *